United States Patent [19]

Swiadek

[11] 4,203,489
[45] May 20, 1980

[54] THERMAL ENERGY STORAGE SYSTEM

[76] Inventor: Stanley F. Swiadek, 2712 W. Alhambra Rd., Alhambra, Calif. 91802

[21] Appl. No.: 801,632

[22] Filed: May 31, 1977

[51] Int. Cl.² .............................................. F28D 21/00
[52] U.S. Cl. ................................. 165/104 S; 126/400
[58] Field of Search ................. 165/104 S, DIG. 4, 4; 126/400, 270; 219/378

[56] References Cited

U.S. PATENT DOCUMENTS

| | | | |
|---|---|---|---|
| 3,301,251 | 1/1967 | Jackson | 219/378 X |
| 3,689,738 | 9/1972 | Laing | 126/400 X |
| 3,823,305 | 7/1974 | Schroder | 126/400 X |
| 3,884,295 | 5/1975 | Laing et al. . | |

FOREIGN PATENT DOCUMENTS

| | | | |
|---|---|---|---|
| 1064378 | 4/1967 | United Kingdom | 219/378 |
| 1328085 | 8/1973 | United Kingdom | 219/378 |

*Primary Examiner*—Albert W. Davis
*Attorney, Agent, or Firm*—Donald D. Mon

[57] ABSTRACT

A modular thermal energy storage system comprises a stack of individual heat storage elements, each element having a sealed metal container filled with liquid such as water and separate thermally diffusing layers of insulation on opposite outer portions of the container, with opposite central portions of the container wall being exposed. The heat storage elements are stacked so as to form spaced apart ducts bounded by the exposed portions of the elements, each duct being formed between adjacent heat storage elements in the stack. The thermally diffusing layers of the elements form outer walls of the stack, and adjacent stacks can be spaced apart to form a passage bounded by the thermally diffusing outer walls of a pair of adjacent stacks. Hot air from a solar heat collector, for example, is passed through the ducts in each stack of elements to transfer heat through the exposed container walls to rapidly heat the liquid in each container. The liquid stores the heat transferred to it, and such heat is slowly and controllably released through the thermally diffusing walls. Cooler air to be heated by the heat storage system flows through the passages between adjacent stacks and draws heat from the thermally diffusing walls of the stacks.

12 Claims, 5 Drawing Figures

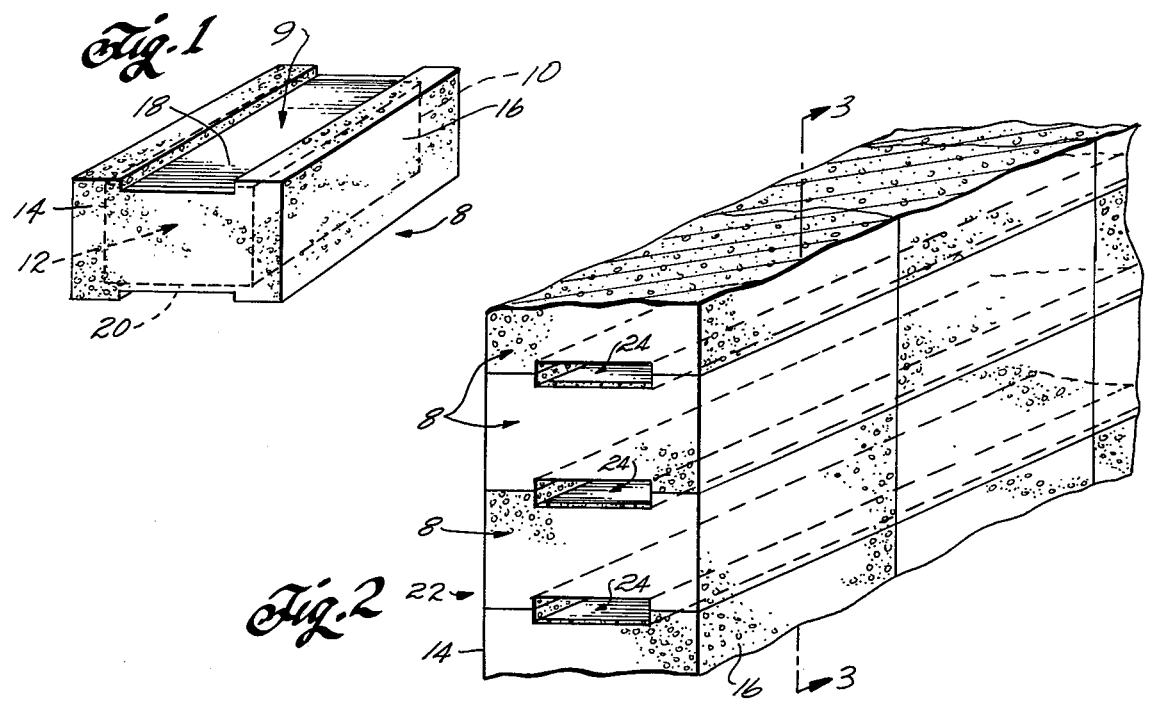
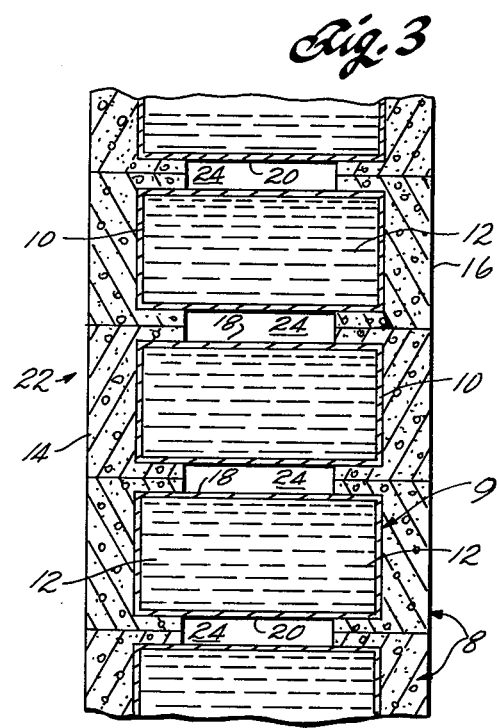

LEGEND:
HOT AIR FROM SOLAR COLLECTOR ⊗ — · — →
AIR TO BE HEATED ⊗ ———→

THERMAL ENERGY STORAGE SYSTEM

BACKGROUND OF THE INVENTION

This invention relates to a thermal energy storage system. The invention is especially useful in storing heat for a solar energy space-heating system.

The present invention is an improvement in heat storage systems over the heat storage means disclosed in the following patents:

| U.S. Pat. No. | Patentee |
| --- | --- |
| 2,677,664 | Telkes |
| 3,464,486 | Rice, et al |
| 3,501,261 | Rice, et al |
| 3,743,782 | Laing |
| 3,884,295 | Laing, et al |

Solar energy heating systems, such as those used for space heating of buildings, have two major components—the solar heat collector and the heat storage system. The present invention is concerned with the heat storage system and the solution to problems which have plagued previous heat storage systems.

At the present time, heat storage systems using water or rock as the heat storing medium are commonly used. Water is an efficient heat storage medium because a small volume of water can store a relatively large amount of heat. However, heat storage systems using water as the storage medium have many problems related to pumping, heat exchangers, piping, valves, location and placement of large tanks, leaks, and insulation. The insulation problems are magnified by the presence of thermal convection currents in large water storage tanks.

Rock piles do not have leakage problems or large convection currents. They heat air directly and thereby eliminate heat exchanger systems. However, rock storage systems are bulky inasmuch as rocks require roughly three times the volume of water to store the same amount of heat. Some units, for ordinary home space-heating use can require as much as 42,000 lbs. of rock. Moreover, such large amounts of rock are commonly housed in structures which are relatively large and thereby occupy valuable ground space. For the majority of present day heat storage applications, neither a water system nor a rock system provides a good, viable solution to heat storage for solar energy systems.

A minimum volume occupied by the heat storage system is an important aspect to be considered in selecting a heat storage system. The solar heat engineer or architect would like to store the maximum amount of heat energy in a minimum volume. In this context, a unit of measurement called the "storage figure of merit (SFM)" with units of BTU/cu.ft./°F., is significant. SFM for a given material is measured by the product of the material's specific heat and its density. For example:

| MATERIAL | SP.HEAT | DENSITY | SFM |
| --- | --- | --- | --- |
| Water | 1.0 | 62.4 | 62.4 |
| Granite (Rock) | 0.2 | 170 | 34.0 |
| Dry Gravel | 0.2 | 120 | 24.0 |
| Stainless Steel | 0.11 | 487 | 53.57 |
| Copper | 0.1 | 540 | 54.0 |
| Aluminum | 0.2 | 165 | 33.0 |

Of the above materials, water has the highest SFM, but heat storage systems using large tanks of water have the problems described above. Stainless steel, copper and aluminum are good heat storage mediums, but the cost of these materials is prohibitive if used largely in a heat storage system. Granite has only slightly more than half the SFM of water, but its low cost makes it competitive for heat storage applications because a larger volume is all that is required for storing more heat, and such a system does not require heat exchangers, complex plumbing, or the installation required by water systems.

Another factor to consider in selecting a heat storage system is the time required to reheat the storage system after some of the heat energy has been withdrawn for constructive use, such as in heating a home. For a water system the reheating time is relatively long because the entire volume of water, typically in the 1500 gallon range for home heating uses, must be heated as a single mass. In a rock system, the reheating time is relatively long because rock is a poor conductor of heat and therefore it requires a relatively long time to conduct heat to the center of each rock.

Thus, there is a need to provide a heat storage system having a relatively high SFM, minimal leakage problems; small, if any, thermal conduction current problems; slow heat loss to the surface (low internal thermal conductivity) to reduce insulation requirements; fast reheating time; and low cost.

SUMMARY OF THE INVENTION

Briefly, this invention provides a heat storage element for a modular heat storage system comprising a core for storing heat, and a layer of insulation, also referred to herein as a thermally diffusing layer, surrounding a portion of the core. The core has a greater capacity to store heat per unit of volume than the insulation so that the core serves as the thermal energy storage portion of the element. The insulation material has a lower thermal conductivity than the core, and the insulation layer slowly and controllably releases heat stored in the core to the exterior of the insulation layer. In one embodiment, the insulating material and the thickness of the insulating layer are such that it requires between 24 hours to 72 hours for a core at a temperature of 210° F. to cool down to 70° F.

A number of such heat storage elements can be stacked together to form a modular heat storage panel in which open ducts extending through such elements are in fluid communication with heat storing cores of such elements. In this way, heat from a fluid passing through the ducts can be rapidly transferred to the core of each element and stored. Cooler air to be heated can be passed adjacent the insulated walls of the heat storage elements to draw heat which is slowly and controllably transferred through the insulated walls of the heat storage elements.

These and other aspects of the invention will be more fully understood by referring to the following detailed description and the accompanying drawings:

DRAWINGS

FIG. 1 is a perspective view showing a heat storage element according to this invention;

FIG. 2 is a fragmentary perspective view showing several of the heat storage elements stacked to form a heat storage panel;

FIG. 3 is a fragmentary cross-sectional view taken on line 3—3 of FIG. 2;

DETAILED DESCRIPTION

Figure 4:
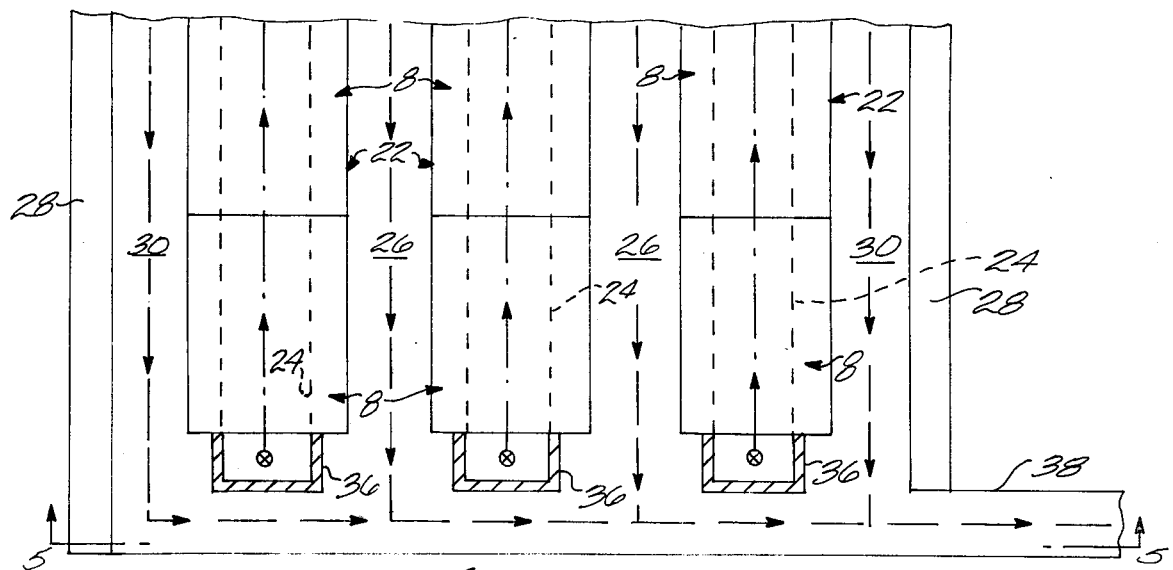
FIG. 4 is a fragmentary plan view showing a heat storage system having several panels comprising stacks of the heat storage elements.

Referring to FIG. 1, a heat storage element 8 comprises a core 9 in the form of a sealed thin-walled hollow container 10 which is filled with a body of liquid 12 (see FIG. 3). The container 10 is preferably shaped as a polyhedron having six rectangular faces. The container is preferably made of metal to take advantage of the relatively good heat transfer characteristics of most metals. The preferred metal is aluminum, although other metals, such as stainless steel, or copper, can be used. Representative exterior dimensions of the container are 4 inches in height, 8 inches in width, and 9 inches in length, as the container 10 is viewed in FIG. 1. The container, as viewed in FIG. 1, defines top and bottom walls, opposite side walls extending the length of the container, and opposite end walls at the front and rear of the container.

The liquid 12 which fills the hollow interior of the container 10 has a good heat capacity. The container has good thermal conductivity so that heat exposed to the container wall can be rapidly transferred to the liquid. Water is the presently preferred liquid because it is relatively inexpensive and because of its ability to store a relatively large amount of heat in a given volume. The container 10 is filled by means of a small hole (not shown) in the top of the container which is sealed after the container is filled.

The purpose of the core 9 is to store as much heat as possible in a given volume. The water-filled container is preferred because of the compromise between good heat capacity and cost of materials. A solid core, such as a solid metal core of aluminum or stainless steel, could be used in many applications, but would appear to be too costly for use in solar energy space-heating systems for homes. The core consists of a material, or a combination of materials, having a higher than average heat capacity. A core having a heat capacity, of SFM at or above about 25 BTU/cu.ft./° F. is a desirable material for the core.

Separate exterior layers of insulation 14 and 16 cover opposite side walls and opposite end walls of the container. The layers of insulation also cover portions of the container top and bottom walls, leaving a portion of the container's top and bottom walls exposed to the atmosphere. The layers of insulation are preferably formed so that a first length 18 of the container is exposed along a central portion of the container top wall, and a second length 20 of the container, the same width as the first length 18, is exposed along a central portion of the container bottom wall. This provides a heat storage element which is generally H-shaped in vertical cross-section (as viewed in FIG. 1) having a separate generally U-shaped centrally located recess extending lengthwise along the top and bottom of each element, with portions of the insulation layers projecting away from the container wall along opposite edges of each recess.

A desirable insulation material is concrete because it is relatively inexpensive and because of its good structural capability and relatively low thermal conductivity. By way of example, the container 10 can have concrete insulation which is two inches thick extending away from the side walls of the container, and one-half inch thick extending away from each end wall of the container as well as the top and bottom walls of the container.

The material used for the insulation layer has a lower thermal conductivity than the material from which the core 9 is made. Conversely, the material used for the core has a greater capacity to store thermal energy per unit of volume than the insulation. The insulating material is preferably one which is structurally rigid at the temperatures at which the core operates, as well as having a relatively low thermal conductivity so that it can allow heat from the core to slowly and controllably diffuse through the walls of the insulation layer. Hence, the insulation layer can be referred to herein as a thermally diffusing layer. The composition and thickness of the insulation are chosen so as to control the time required for a given amount of heat to transfer from the core to the outside of the insulating layer. Examples of suitable insulating materials, other than concrete, are ABS or epoxy resins, Bakelite, or other thermosetting synthetic resinous materials, or composite materials containing concrete, synthetic resins and/or suitable fillers, as well as foamed or expanded resinous materials such as polyurethane, or foamed concrete.

The insulating material is such that the combination of heat conductivity of the material and thickness of the insulating layer would prevent the core 9 from cooling to a room temperature of 70° F. (for ambient temperature) from a temperature of 210° F. in less than 24 hours. It is desirable to provide insulation around the core which controls the release of heat from the core so that the time required for the core to cool down from a temperature of 210° F. to ambient temperature 70° F. is in the range of 24 to 72 hours. The insulation layer also desirably controls the release of heat from the core to the extent that the core for a given heat storage element can heat up (i.e., store a given amount of thermal energy) as fast or faster than the time it takes for the core to cool down (i.e., release the same amount of thermal energy). An insulating material having a heat conductivity characteristic of about 0.75 BTU/FT$^2$/ft/° F. or lower is desirable.

A number of the heat storage elements are stacked vertically in a column to form a modular heat storage panel 22 shown in FIGS. 2 and 3. The modular heat storage system of this invention will be described below in the context of vertically stacked elments, although the elements also can be stacked in horizontal rows, or in other orientations, if desired.

When the heat storage elements are stacked vertically in a column, the centrally located, recessed, exposed metal portions of the adjacent elements in the stack automatically form vertically spaced apart air flow ducts 24 extending lengthwise between adjacent elements. When a panel is formed from several vertical stacks of elements which are aligned end-to-end, as shown in FIG. 2, the ducts 24 extend the length of the panel and are open at opposite ends of the panel.

Figure 5:
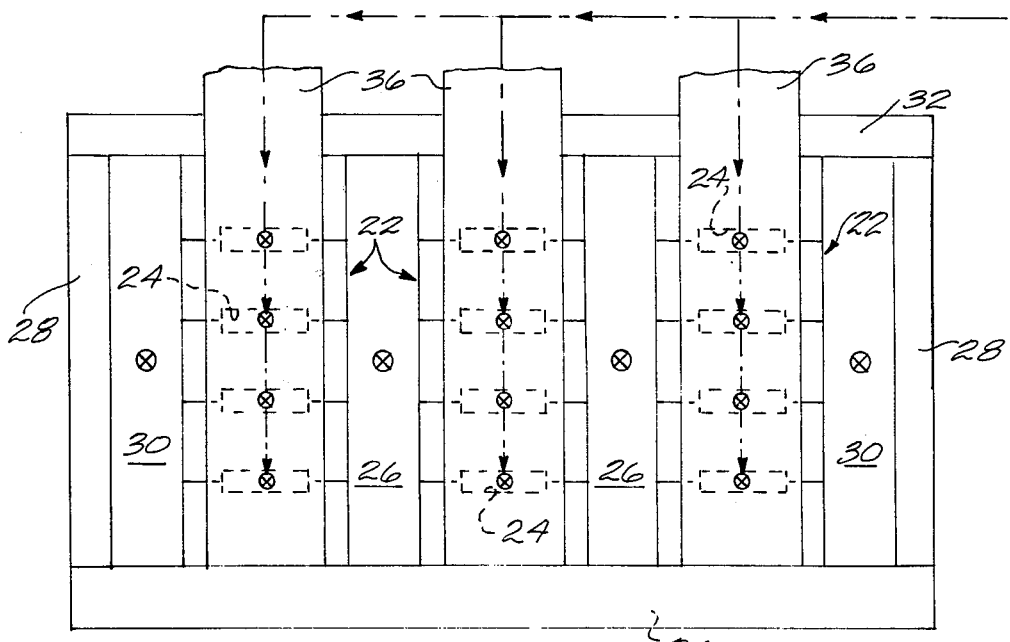
FIG. 5 is a fragmentary elevation view taken on lines 5—5 of FIG. 4.

As shown in FIGS. 4 and 5, several horizontally spaced apart panels 22 are stacked parallel to one another to form a modular heat storage system. The side walls of the modular panels 22 form insulated opposite side walls of a separate air flow passage 26 between each pair of panels. Separate insulated blocks 28 are spaced apart from the outermost panels in the system to form insulated outer air flow passages 30. The top and bottom of the passages 26 and 30 are insulated by upper and lower insulating blocks 32 and 34, respectively. Preferably, the insulating blocks 28, 32 and 34 are made from a material having high heat insulating capability, higher than that of the insulating layers on the heat storage elements. The insulating blocks 28, 32 and 34 can be made from such good thermal insulators as foamed polystyrene, cellulose, vermiculite, rock wool, glass fibers, or the like.

Separate vertically extending ducts 36 circulate hot air from a heat source, such as a solar heat collector (not shown) or a furnace (not shown), through the ducts 24 in each panel 22. The heat from the hot air in the ducts is rapidly transferred through the exposed metal walls of the heat storage elements to the water 12 inside the individual containers 10. Relatively cooler air to be heated is circulated countercurrent to the flow through the ducts, the cooler air being circulated through the separate air flow passages 26, 30 adjacent the insulated side walls of each panel, and out through a duct 38. Heat is transferred from the water in the containers through the insulated walls of the heat storage elements. The heat transfer rate is controlled by the thickness of the walls of insulation and the heat transfer capability of the insulating material. As the heat diffuses slowly through the insulated walls of the panels, it is picked up by the air circulated through the passages 26, 30 adjacent the panels. The heat released from the walls of the insulation is used to heat the cooler air, which can be air in a forced air system being circulated for space-heating of a building.

The total amount of heat transferred to the cooler air is dependent, among other factors, upon the number of heat transfer elements used in the heat storage system; the volume of each element, including the thickness of the insulating layer in each element; and the difference between the temperature of water in the containers at any given time and the temperature of the cooler air. By way of example, a heat transfer element of the size described above and having concrete insulation, an aluminum container, and water in the container, will require about 72 hours to drop the temperature of the water by 130° F. (from 210° F. to 80° F.). This figure is calculated for an element in the center of a panel where heat can transfer only through the two opposite side walls whose faces form part of the air flow passages. Heat loss in other directions is inhibited by the presence of other elements at the same temperature as the subject element.

Varying the thickness and/or the thermal conductivity of the insulating material will extend or reduce the number of days over which the heat storage system will cool down. Varying the number of heat storage elements controls the total amount of heat energy, in BTU's, available for distribution during a given time interval. Therefore, the size of the heat storage system, in BTU's, and the rate of heat energy delivered to the house, or user, can be specifically designed to make maximum use of local environmental characteristics and/or user needs.

For example, a thermal storage system to be used in a mild climatic region having a recorded probability of daily sunshine over 90% requires a relatively small number of elements, because the heat storage requirement would be for overnight use only inasmuch as complete recharging would take place the following day 90% of the time. In addition, the insulation material and thickness of insulation around the core of each element can be designed for 24 hours storage as a compromise between minimizing the volume occupied by the entire thermal storage system, and the need to provide heat after 24 hours of no sunshine.

Conversely, a thermal storage system used in a northern climatic region can have a larger number of elements, each of which has a four or five day insulation design, so that the system can store sufficient heat for use over several successive days and nights in which essentially no solar heat is collected.

Example

A water-filled container having dimensions of 4 inches × 8 inches × 9 inches, as described above, is provided with a high temperature plastic insulation layer having thermal characteristics similar to ABS resin. The insulation has a side wall thickness of ¼th inch, and top, bottom, and end wall thicknesses ⅛th inch. The volume of the resulting heat storage element is about 334 cubic inches.

Neglecting the specific heats of the plastic insulation and the aluminum container, the SFM of the element is 52.2, as opposed to 62.4 for water, or 34.0 for granite, or 24.0 for dry gravel.

The thermal energy storage per element for a temperature change of 130° F. (210° F. minus 80° F.) is 1313.9 BTU.

A well insulated California type ranch house having 1,500 sq. ft. of living area requires about 78,000 BTU per day, or 234,000 BTU for three days of heating. These figures are based on a well-insulated 6,500 DD (degree-days) house in the Los Angeles area having an average of 375 DD in January. From these data it can be determined that 178 heat storage elements are required for such a house.

For convenience, using 200 heat storage elements for the house, the total volume of the elements is 38.7 cubic feet. Allowing for external insulation, spaces between blocks, supports, etc., the total volume of the heat storage system does not exceed 100 sq. ft., or a volume having exterior dimensions of 4 feet × 5 feet × 5 feet.

It has been determined that such a house having such a heat storage system can be charged (reheated) in one day by a solar collector approximately 100 sq. ft. in area, and would keep the house at comfortable temperatures for a minimum of three days without recharging. To extend the number of days over which the heat storage system can operate without being recharged, the thickness of the insulation in the elements can be increased, or more elements can be used.

Thus, a heat storage element is provided in which the core becomes the thermal energy storage portion of the element, and the insulation becomes a means of controlling the release of thermal energy stored in the core. The portion of the core that is not covered by the layer of insulation provides a means for rapidly heating and reheating the core, as opposed to reheating through the layer of insulation (as in the case of reheating the center of a rock). The modular construction provides a means for reheating an entire assembly of elements in sequential steps so that a portion of the storage system can be reheated rapidly to useful temperatures, as opposed to a water system where the entire volume can be brought to useful temperatures only at a substantial increase in time.

The heat storage system of this invention can be used in applications for new residences, retrofitted into existing residences, or used in new mobile homes as well as existing mobile home units. This sytem can be designed into new structures as part of, or independent of, structural supporting walls. It can be retrofitted into existing structures because the storage system can be made vertical, horizontal, cubic, or divided into sections to fit where space is available. It can be retrofitted into mobile homes by using the space under the home and above ground, while requiring no excavation. It can be designed to make use of specific conditions of daylight sunshine and short cool nights (desert regions), or intermittent sunshine and long cold nights (Northern states). It can also be modified for increased storage capacity without major rework by simply adding more storage elements.

The present invention has been described in the context of a system for storing heat although it will be recognized that the system shown in FIGS. 4 and 5 can operate in the reverse mode for the purpose of cooling instead of heating. In this instance, the thermal energy collector can be arranged to cool down at night. Cool air from the collector is then circulated through the ducts of the thermal energy storage unit. When air to be cooled is passed adjacent the insulated exterior of the thermal energy storage unit, the insulation is warmed up, which cools the air.

It will also be recognized by those skilled in the art that other structural arrangements of the individual thermal energy storage elements can be used to form a heat storage unit having ducts passing through the individual elements, with a portion of each element providing a means for rapid heat transfer between a heated fluid in contact with each duct and the core of each element, together with a layer of insulation on each element which controls the release of heat from the core of each element through the walls of the insulation to the exterior of the heat storage unit.

By way of example, a duct can be provided through the center of each element, and the core for that element can surround the duct. The walls of the duct can be made from a material which is a good thermal conductor to rapidly transfer thermal energy to the surrounding core material. The core can be surrounded by a layer of insulation of controllably release heat from the core through the walls of the insulation.

Alternately, each element can comprise a pair of adjoining extruded or injection molded plastic shells of insulation with an embedded metal plate. When the shells are joined they form an interior area bounded by the metal plates. The interior can have a material with a high heat capacity, such as water, to serve as the heat storage core.

The duct of each element also can comprise a heat tube which extends to the exterior of the element to receive heat and rapidly transfer the heat to the core of the element. In this instance, the insulation can totally enclose the core.

The insulation also can be a particulate material constrained in an outer shell.

Further, the heat storage elements can be assembled as a unit and sealed together so as to transmit liquids, as well as air, through the unit.

What is claimed is:

1. A modular thermal energy storage system comprising:
a plurality of individual thermal energy storage elements, each element having a core for storing thermal energy, a thermally diffusing layer adjacent at least a portion of the exterior surface of the core, and duct means for conducting relatively warmer air for transfer of its thermal energy to the core independently of transfer through the thermally diffusing layer, the core having a greater capacity to store thermal energy per unit of volume than the thermally diffusing layer, the thermally diffusing layer having a lower thermal conductivity than the core and a thickness that will slowly and controllably release, through the thermally diffusing layer to the exterior of the element, the thermal energy stored in the core,
means for assembling the thermal energy storage elements as a unit having an outer wall formed by the thermally diffusing layers, the duct means extending through the unit to transfer thermal energy to the individual cores to store such thermal energy in the cores, the outer wall providing a means for controllably releasing the thermal energy stored in the cores of such elements,
means for passing relatively warmer air through the duct means,
means forming a passage adjacent said outer wall, and
means for passing relatively cooler air through the passage to draw away heat released through the outer wall.

2. The thermal energy storage system according to claim 1 in which the core of such elements comprises a sealed hollow container and a body of liquid in the container.

3. The thermal energy storage system according to claim 1 in which each element has a layer of such thermally diffusing material adjacent at least a first portion of the core, and in which a second portion of such core is essentially devoid of such thermally diffusing material; and in which the storage units are assembled so that second portions of adjacent elements form an open said duct means for transferring thermal energy to the core of such elements.

4. The thermal energy storage system according to claim 1 in which a portion of said duct means extends through each element, and in which the elements are assembled in rows to form said duct means as an elongated duct which extends through the elements in each row.

5. The thermal energy storage system according to claim 2 in which the liquid in each container includes water.

6. The thermal energy storage system according to claim 5 in which each container is made of metal.

7. The thermal energy storage system according to claim 1 in which the thermally diffusing layer includes a synthetic resinous material.

8. The thermal energy storage system according to claim 1 in which the thermally diffusing layer includes concrete.

9. The thermal energy storage system according to claim 1 in which the material and the thickness of the thermally diffusing layer are such that it requires between 24 hours to 72 hours for the core to cool down to a temperature of 70° F. from a temperature of 210° F.

10. The thermal energy storage system according to claim 1 in which the heat conductivity of the thermally diffusing material is at or below about 0.75 BTU/ft$^2$/ft/° F.

11. The thermal energy storage system according to claim 10 in which the heat capacity of the core is at or above 25 BTU/cu.ft/° F.

12. The thermal energy storage system according to claim 1 in which the thermally diffusing outer wall formed by the assembled elements is continuous to thermally isolate the passage adjacent the outer wall from the duct means inside the assembled elements so that relatively cooler air passing through the passage draws heat away from the outer wall while being thermally isolated from the duct means.

* * * * *